(12) United States Patent
Tanner

(10) Patent No.: US 9,782,923 B2
(45) Date of Patent: Oct. 10, 2017

(54) PNEUMATIC ADJUSTMENT SYSTEM

(71) Applicant: M. TANNER AG, Illnau (CH)

(72) Inventor: Marcel Tanner, Bassersdorf (CH)

(73) Assignee: M. TANNER AG, Illnau (CH)

( * ) Notice: Subject to any disclaimer, the term of this patent is extended or adjusted under 35 U.S.C. 154(b) by 0 days.

(21) Appl. No.: 15/148,182

(22) Filed: May 6, 2016

(65) Prior Publication Data

US 2016/0332354 A1 Nov. 17, 2016

(30) Foreign Application Priority Data

May 13, 2015 (CH) ...................... 0672/15

(51) Int. Cl.
| | | |
|---|---|---|
| *B65G 51/03* | (2006.01) | |
| *B65G 21/20* | (2006.01) | |
| *B29C 49/42* | (2006.01) | |
| *B29K 105/00* | (2006.01) | |
| *B29L 31/00* | (2006.01) | |
| *F15B 15/24* | (2006.01) | |

(52) U.S. Cl.
CPC ........ *B29C 49/4205* (2013.01); *B65G 21/209* (2013.01); *B65G 21/2072* (2013.01); *B65G 51/035* (2013.01); *B29K 2105/258* (2013.01); *B29L 2031/712* (2013.01); *B65G 2201/0247* (2013.01); *F15B 15/24* (2013.01)

(58) Field of Classification Search
CPC  B29C 49/4205; B65G 21/072; B65G 21/209; B65G 51/035
USPC ........................................ 198/836.1, 836.3
See application file for complete search history.

(56) References Cited

U.S. PATENT DOCUMENTS

| | | | | | |
|---|---|---|---|---|---|
| 5,542,789 | A | * | 8/1996 | Aidlin ................ | B65G 21/2072 406/88 |
| 6,685,401 | B1 | * | 2/2004 | de Almeida Rodrigues ............ | B65G 51/035 406/11 |
| 6,827,203 | B2 | * | 12/2004 | Andreoli ............ | B65G 21/2072 198/836.3 |
| 7,404,482 | B2 | * | 7/2008 | Deflandre .......... | B65G 21/2072 198/597 |
| 7,717,254 | B2 | * | 5/2010 | Brackley .............. | B65G 49/063 198/626.1 |

(Continued)

FOREIGN PATENT DOCUMENTS

| | | |
|---|---|---|
| DE | 102009016593 A1 | 10/2010 |
| DE | 102011118519 A1 | 5/2013 |
| EP | 1277677 A1 | 1/2003 |

(Continued)

OTHER PUBLICATIONS

Search Report for Switzerland Application No. 00672/15 filed May 13, 2015.

*Primary Examiner* — Douglas Hess
(74) *Attorney, Agent, or Firm* — Notaro, Michalos & Zaccaria P.C.

(57) ABSTRACT

The present invention is aimed at an adjustment system, in particular for adjusting the distance apart of at least two guide mechanisms for the transport of, for instance, preforms for plastics containers, wherein the at least two guide mechanisms are respectively connected to a setting unit, and wherein the setting unit comprises in each case at least one piston-like element, which is pneumatically movable to and fro between a first stop and a second stop within the setting unit.

13 Claims, 6 Drawing Sheets

(56) References Cited

U.S. PATENT DOCUMENTS 8,132,665 B2 * 3/2012 Pawelski ............ B65G 21/2072
198/836.1

FOREIGN PATENT DOCUMENTS

EP 2848558 A1 3/2015
WO 2011029949 A1 3/2011

* cited by examiner

PNEUMATIC ADJUSTMENT SYSTEM

The invention relates to a pneumatic adjustment system for adjusting the distance apart of at least two guide mechanisms, for example guide rails for the evacuation and onward transport of, for instance, preforms for plastics containers, of a roller orientor, this for further processing in, for example, a downstream inspection and ejector unit.

For the setting or adjustment of the distance apart of the guide rails, on which the preforms, for transport, respectively rest with their collars—i.e. for the setting of the width, as becomes necessary, for instance, whenever the preform size or the width of the preform collar is changed—it was previously customary to actuate the appropriate width adjusting units along the transport path in each case manually, i.e. adjust them individually via appropriate adjusting bolts, as is described, for instance, in EP 2 848 558 A1.

This procedure has inherently proved itself in practice; recently, however, in particular also with regard to the high downtime costs of the downstream stretch blowing and bottling plants, the call for a (yet) more efficient switching facility from one preform size to another has become louder.

The object of the present invention is therefore to provide an adjustment system by means of which a change from one preform size to another can be more rapidly effected with substantially the same reliability and accuracy.

This object is achieved according to the invention by an adjustment system, in particular for setting the distance apart of at least two guide mechanisms for the transport of, for instance, preforms for plastics containers, wherein the at least two guide mechanisms are respectively connected to a setting unit, and wherein the setting unit comprises in each case at least one piston-like element, which is pneumatically movable to and fro between a first stop and a second stop within the setting unit.

The guide mechanisms are here configured preferably in the form of two Z-profiles which lie opposite each other in mirror symmetry (i.e. for the resting of the collar of the preforms on the top side and, where appropriate, for the sliding of the preforms along the transport path), and further preferably in the form of two L-profiles, which lie opposite each other in mirror symmetry, with bent plates fastened thereto, (i.e. for the lateral guidance of the cylindrical preform bodies). In the event of a switchover from preforms according to PCO 28 mm (standard for PET preforms, PCO="Plastic Closure Only") to preforms according to WN 38 mm (WN="Wide Neck"), on each side a stroke of 5 mm, for example, must be overcome (i.e. respectively outward).

In a preferred embodiment of the present invention, the setting unit respectively defines an air chamber, in which parts at least of the piston-like element are movably mounted. Preferably, the piston-like element is here configured in the form of a piston rod, which has a shank part and a piston part. Further preferably, in particular the piston part of the piston rod divides the air chamber into a first air chamber side (situated toward the outside) and a second air chamber side (situated toward the inside). The piston part here butts against the bottom side and against the top side of the air chamber and can be moved, together with the shank part, to and fro in a horizontally sliding manner in the air chamber. Preferably, the first and the second air chamber side are respectively connected to a pneumatic supply device, so that each of the two air chamber sides can be separately subjected to compressed air via appropriate lines or ducts, such that a stroke of the piston, in the outward or inward direction, can be executed. The pneumatic supply device is here arranged, preferably removably, on the outer side of the respective setting unit. The pneumatic supply devices (i.e. of all the setting units along the transport path) are preferably actuated by means of a central lever, so that the respectively set piston stroke can take place simultaneously in all setting units.

In a preferred embodiment of the present invention, at least one of the two stops of the setting unit is configured adjustably. Preferably, this is the outer stop, since this can be more easily actuated by an operator. However, an adjustable configuration of the inner stop is also conceivable.

Further preferably, the at least one adjustable stop of the setting unit is configured on a stroke setting element. The stroke setting element and its end face, which concretely serves as a stop, can here be screwed by means of an appropriate thread into the first air chamber side (i.e. the outward air chamber side). In this regard, the stroke setting element has at its outwardly protruding end a rotary knob-like configuration and is additionally preferably closed off by a plastics cap.

In a still further preferred embodiment of the present invention, the setting unit has a shaft-like element, which is movable relative to the piston-like element and by means of which a measure is settable in relation to the piston-like element. Preferably, the shank part of the piston-like element here has a hollow shank, which surrounds, at least partially, the shaft-like element. Further preferably, the piston-like element and the shaft-like element are slidingly movable relative to each other, i.e. the shaft-like element slides within the hollow shank of the piston-like element. The outward facing end of the shaft-like element has a threaded portion, which cooperates with a corresponding threaded portion of a nut which is fitted on the outward facing end of the shaft-like element and is preferably separated from the shank part of the piston-like element by a disk element. The nut can be actuated from the outside by removal of the aforementioned plastics cap, and the shaft-like element can in this way be horizontally adjusted.

Further preferably, on the shaft-like element, preferably on a fastening portion on the inward facing end region, is respectively arranged or fastened the guide mechanism (i.e. either having the Z-profile or else having the L-profile with the thereto fastened bent plate).

Further preferably, the piston-like element, preferably its shank part, has on its end facing toward the guide mechanism a sleeve element. Between the sleeve element and the fastening portion of the shaft-like element, which fastening portion lies opposite the sleeve element, is further preferably arranged a spring, which is supported against the sleeve element and against the fastening portion and in this way generates a pretension.

In a further preferred embodiment of the present invention, the stroke setting element surrounds, at least partially, the piston-like element and the shaft-like element and is movable relative to these. Further preferably, the stroke setting element and the piston-like element are slidingly movable relative to each other. The threaded joint of the stroke setting element is realized with a corresponding region of an external wall portion of the setting unit. Preferably, the piston-like element is configured coaxially to the shaft-like element (as well as to the horizontal axis $X_1$ of the setting unit), and the stroke setting element is configured at any rate coaxially to the shank part of the piston-like element (as well as to the shaft-like element and to the horizontal axis $X_1$ of the setting unit).

Due to the above-described configuration, the respective operator can thus, from the outer side of the plant, set the stroke of the piston-like element or of the piston part within the air chamber of the setting unit and, in addition thereto, the measure between the piston-like element and the fastening portion of the shaft-like element.

In this way, moreover, an extremely high variability in the switchover from one preform size to another preform size can be provided.

In a still further preferred embodiment of the present invention, the adjustment system additionally comprises a height adjusting mechanism, which has at least: a pivotably mounted lever arm, on the free end of which, preferably on the bottom side of which, is arranged a height guide unit; a U-shaped bracket, which protrudes substantially perpendicularly (downward) from the lever arm and which is mounted movably between two ball head elements and, preferably, disks each movably arranged on the ball head elements; wherein the ball head elements are preferably arranged on a horizontally movable longitudinal adjustment device, wherein preferably at least one of the ball head elements is spring-loaded on the horizontally movable longitudinal adjustment device; and wherein, from the starting position of the height adjusting mechanism, a horizontal forward movement of the longitudinal adjustment device, i.e. substantially in the direction of the height guide unit, via a tilting movement of the U-shaped bracket and via a (practically simultaneous) pivot movement of the lever arm, is converted into a substantially vertical upward movement of the free end of the lever arm, as well as of the height guide unit.

However, the height adjusting mechanism can also in itself form a separate aspect of the present invention, for instance as: a height adjusting mechanism for a transport path for preforms for plastics containers, which has at least: a pivotably mounted lever arm, on the free end of which, preferably on the bottom side of which, is arranged a height guide unit; a U-shaped bracket, which protrudes substantially perpendicularly (downward) from the lever arm and which is mounted movably between two ball head elements and, preferably, disks each movably arranged on the ball head elements; wherein the ball head elements are preferably arranged on a horizontally movable longitudinal adjustment device, wherein preferably at least one of the ball head elements is spring-loaded on the horizontally movable longitudinal adjustment device; and wherein, from the starting position of the height adjusting mechanism, a horizontal forward movement of the longitudinal adjustment device, i.e. substantially in the direction of the height guide unit, via a tilting movement of the U-shaped bracket and a (practically simultaneous) pivot movement of the lever arm, is converted into a substantially vertical upward movement of the free end of the lever arm, as well as of the height guide unit.

The longitudinal adjustment device of the height adjusting mechanism here preferably has a spindle-shaped configuration (which in turn is preferably actuable from outside), wherein the two ball head elements are arranged lying one opposite the other on the smooth shank portion—separated by the U-shaped bracket and the two movably arranged disks (and, where appropriate, a sliding part enclosed by the U-shaped bracket).

The (generally somewhat smaller) second ball head element which is preferably arranged on the free end of the smooth shank portion of the longitudinal adjustment device is here fixedly fitted in a standard manner. The other (generally somewhat larger) first ball head element is spring-loaded, wherein the spring is supported against a rear stop face of the first ball head element and against an internal wall portion of the housing of the height adjusting mechanism.

The height guide unit can be configured in the form of a linkage or in the form of a C-profile or, in some other suitable manner, according to choice.

Exemplary embodiments of the present invention are illustrated on the basis of the appended drawings with a view to greater clarity, wherein.

Figure 1:
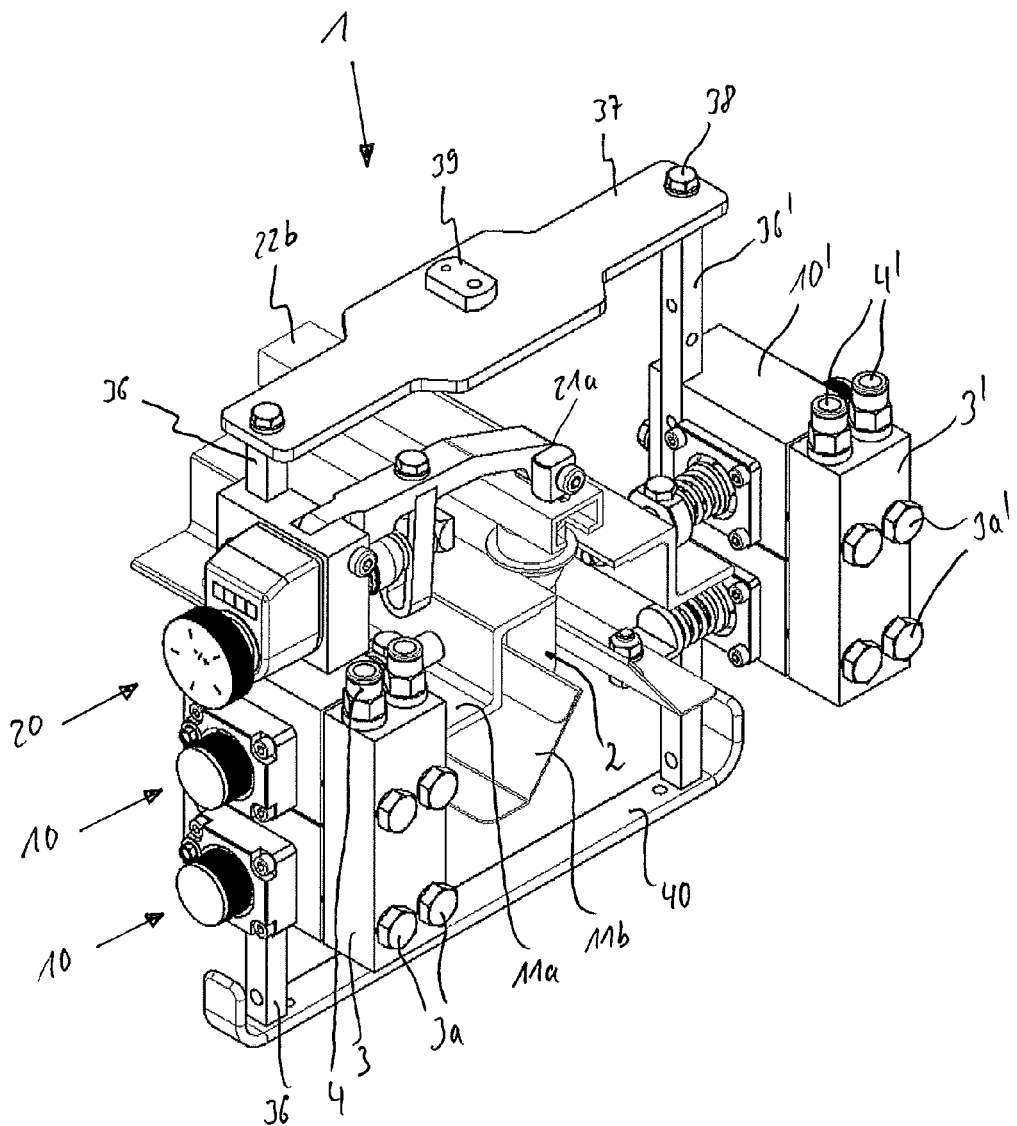
FIG. 1 shows a perspective view of an adjustment system according to the invention with a preform having a first size, and of the height adjusting mechanism in its starting position (no deflection)
Figure 2:
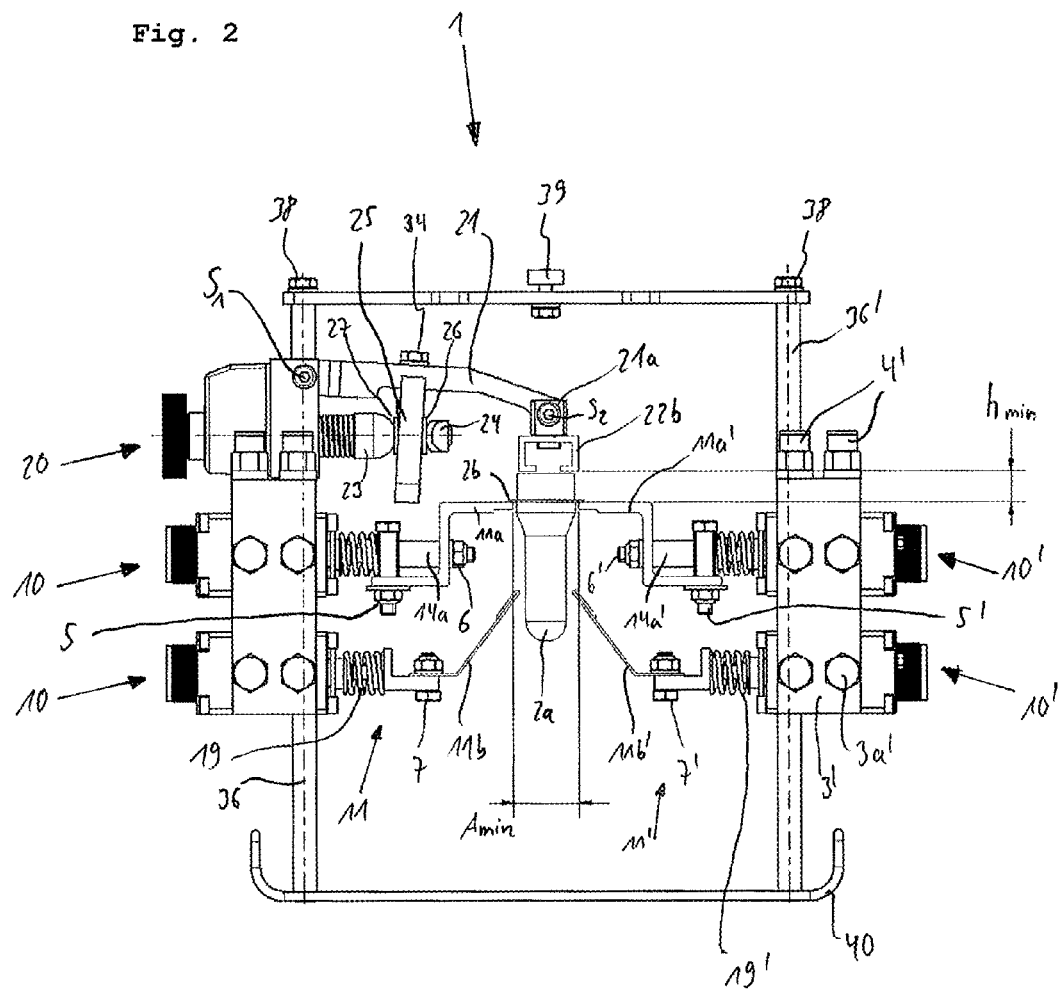
FIG. 2 shows a side view of an adjustment system according to the invention with a preform having a first size, and of the height adjusting mechanism in its starting position (no deflection)

In FIGS. 1 and 2, an exemplary embodiment of the adjustment system 1 according to the invention is represented with a preform 2 of smaller size (for example the above-stated PCO 28 mm). The adjustment system 1 is in its working position. The frame of the adjustment system 1 is formed of the mounting bars 36, 36', which at their upper ends are connected via a transverse strut 37, i.e. bolted together with appropriate bolts 38. On the transverse strut 37 is found a fastening mechanism 39, which, where appropriate, serves to fasten longitudinal struts which run along a transport path and establish a connection to further adjustment systems (not shown). At their lower end, the mounting bars 36, 36' are connected by a head guard 40, having rounded free ends, in order in particular to avoid head injuries to the operators. The head guard 40 can additionally have a rubberized bottom side.

On the mounting bars 36, 36' are fitted, in particular, the setting units 10, 10', which serve for a horizontal adjustment of the guide mechanisms 11, 11'. The mutually opposing setting units 10 and 10' here respectively comprise analogously configured guide mechanisms 11, 11'. The two lower setting units 10, 10' respectively comprise as the guide mechanism 11, 11' an L-profile 11b, 11b', on which is arranged an upwardly bent plate, which serves for the lateral guidance of the cylindrical body 2a of the preform 2. The bent plated L-profile 11b, 11b' is here respectively fastened to the setting unit 10, 10' by means of a bolted joint 7, 7'.

The two uppermost setting units 10, 10' respectively have as the guide mechanism 11, 11' Z-profiles 11a, 11a' (in turn arranged in mirror symmetry). These are connected to the respective setting unit 10, 10' by means of two bolted joints 5, 5' and 6, 6'. The bolted joint 6, 6' is here realized on a fastening portion 14a, 14a', of the setting unit 10, 10'. The preform 2 rests with its collar 2b on the top side of the two mutually opposing Z-profiles 11a, 11a', so that said preform can be transported onward or away along a generally inclined transport path.

Between the guide mechanisms 11, 11' and the inward facing wall of the setting unit 10, 10' is respectively arranged a spring 19, 19', the function of which is explained further below. Above the setting unit 10, 10' having the Z-profile 11a, 11a' is arranged a height adjusting mechanism 20, here on the left-hand side, with which a height guide unit 22 (here in the form of a C-profile 22b) can be adjusted in the vertical direction in relation to the top side or mouth opening of the preform 2. The distance from the bottom side of the C-profile 22b to the collar 2b of the preform 2 is here minimal and is correspondingly indicated with $h_{min}$.

The height adjusting mechanism 20 is in turn fitted on the mounting bar 36 and comprises a lever arm 21, which is mounted pivotably about a pivot axis $S_1$. On the free end 21a of the lever arm, the C-profile 22b is likewise pivotably mounted, to be precise with respect to the (second) pivot axis $S_2$. Furthermore, roughly in the middle of the lever arm 21 is provided a U-shaped bracket 25, which protrudes perpendicularly downward and which is arranged between a first ball head element 23 and a second ball head element 24 or between two respectively intervening disks 26 and 27. Via this height adjusting mechanism 20, the vertical position of the C-profile 22b can be altered (i.e. in this case, from the shown starting position, can be moved into a higher vertical position). The precise working method of the height adjusting mechanism 20 is explained in detail further below, in connection with FIG. 8.

It is further apparent that on the outer side of the setting units 10, 10' is respectively arranged a pneumatic supply device 3, 3', which concretely by means of the bolts 3a, 3a' is bolted to the side of the setting units 10, 10'. On the top side of the pneumatic supply device 3, 3' are respectively provided ports for compressed air 4, 4'. The distance between the two Z-profiles 11a and 11a' for the reception or holding of the (smaller) preform 2 is here indicated with $A_{min}$.

Figure 3:
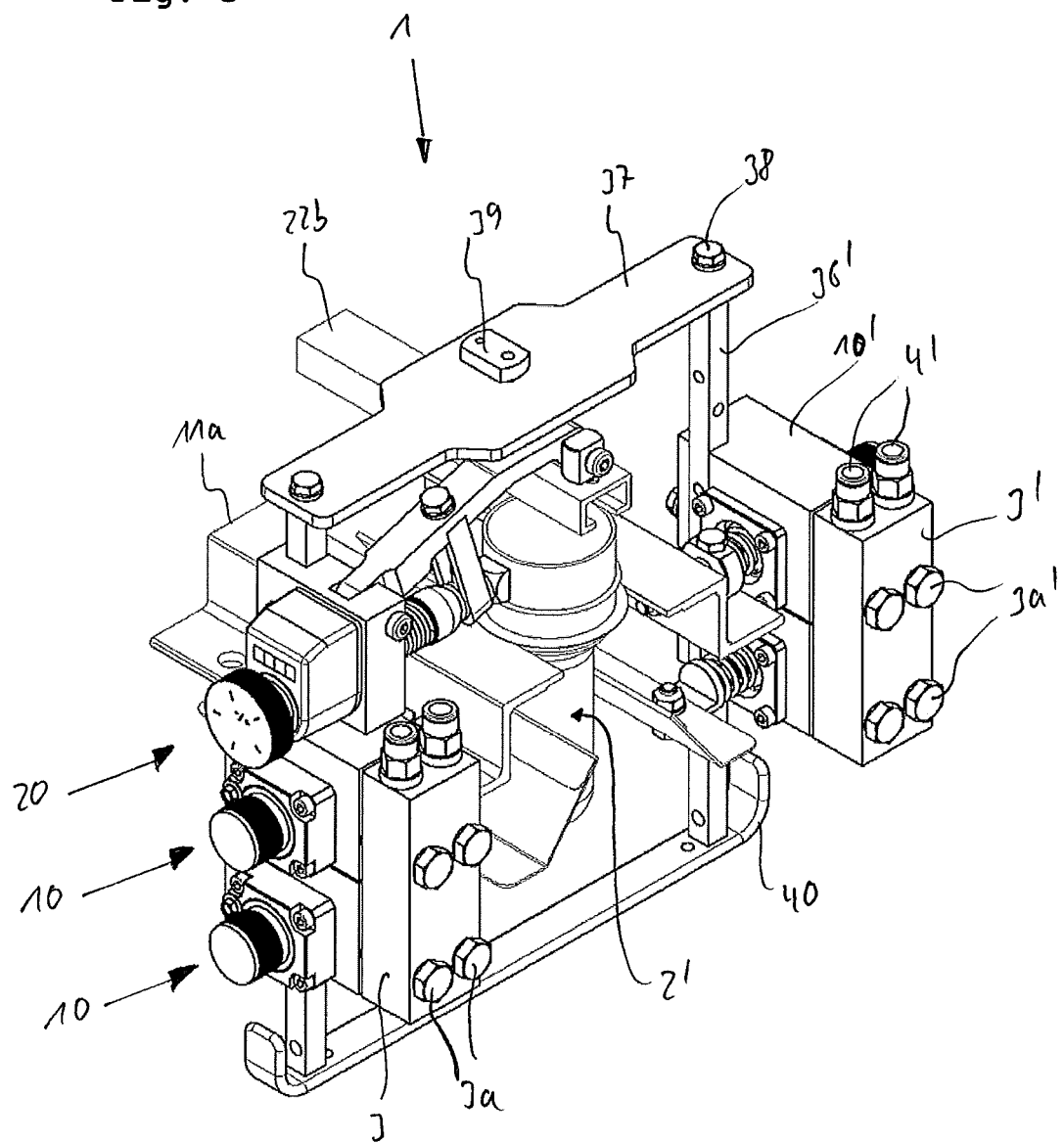
FIG. 3 shows a perspective view of an adjustment system according to the invention with a preform having a second size, and of the height adjusting mechanism in its end position (maximum deflection)
Figure 4:
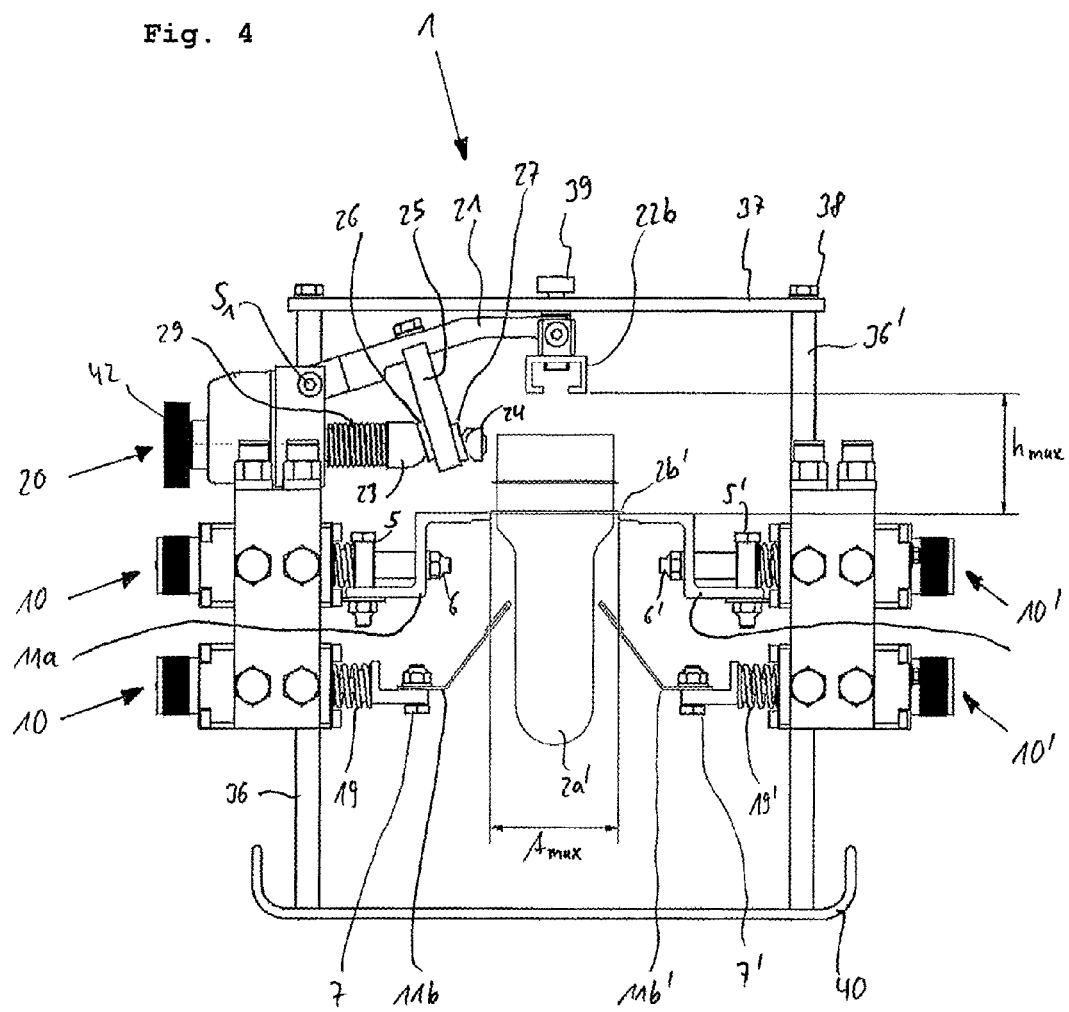
FIG. 4 shows a side view of an adjustment system according to the invention with a preform having a second size, and of the height adjusting mechanism in its end position (maximum deflection)

In FIGS. 3 and 4, the adjustment system 1 according to the invention is now shown with a larger preform 2' (for example a preform according to WN 35 mm). The adjustment system 1 according to the invention has here been brought, in relation to its starting or working position ($A_{min}$, $h_{min}$) represented in FIGS. 1 and 2, into a maximum position ($A_{max}$, $h_{max}$). The distance $A_{max}$ is dictated by the wider collar 2b' of the preform 2', wherein also the lateral guides 11b, 11b' (that is to say respectively the L-profiles having the upwardly bent plate 11b, 11b') have a greater distance apart, since also the diameter of the cylindrical body 2a' of the preform 2' has a larger diameter.

It is additionally apparent that the springs 19, 19', which are respectively arranged between the setting unit 10, 10' and the guide mechanism 11, 11' or the appropriate fastening portion 14a, 14a' of the setting unit 10, 10', have respectively been compressed.

Also the height adjusting mechanism 20 has been moved out of its starting position shown in FIGS. 1 and 2.

The distance from the bottom side of the C-profile 22b to the collar 2b' of the larger preform 2' is now, as mentioned above, $h_{max}$. This is dictated by the switchover to a correspondingly larger bottle mouth; once the switchover has been completed, the C-profile 22b can be brought back, however, into a position in which—in accordance with the position shown in FIGS. 1 and 2—it is almost bearing against the mouth opening of the preform, in order to ensure a precise height guidance.

The lever arm 21 of the height adjusting mechanism 20 has moved correspondingly upward and has been pivoted about the (first) pivot axis $S_1$. This was achieved by adjustment of the height adjusting mechanism 20 via its rotary knob 42, to be precise such that the first spherical element 23 was moved horizontally in the direction of the C-profile 22b, which has triggered a tilting of the U-shaped bracket 25 together with a sliding movement of the respectively adjacent disks 26, 27, as well as a simultaneous pivot movement of the U-shaped bracket 25 together with the lever arm 21 relative to the pivot axis $S_1$. This movement has been correspondingly converted into a vertical movement of the C-profile 22b (pivotably) fastened to the free end 21a of the lever arm (the arrangement of the C-profile 22b on the pivot axis $S_2$ causes the C-profile 22b or the bottom side of the C-profile to remain parallel to the top side or the mouth opening of the preform 2').

Figure 5:
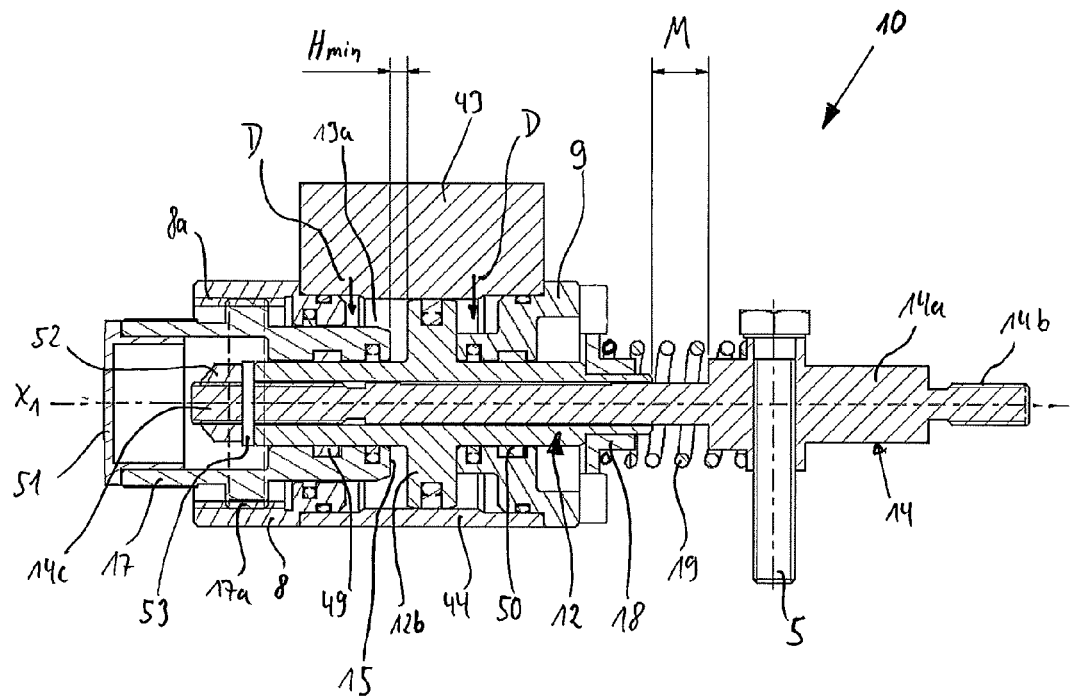
FIG. 5 shows a lateral cross-sectional view of a setting unit according to the invention (for width setting) with minimum stroke of the piston-like element.
Figure 6:
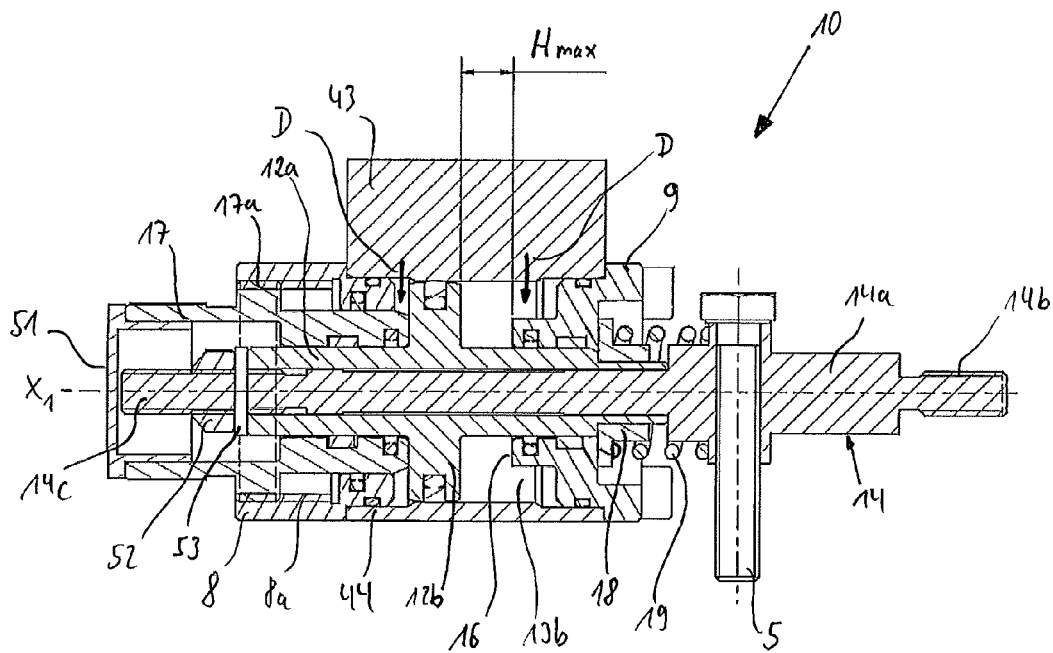
FIG. 6 shows a lateral cross-sectional view of a setting unit according to the invention (for width setting) with maximum stroke of the piston-like element.

In FIGS. 5 and 6, a setting unit 10, 10' according to the invention is shown below by way of example in two different positions, to be precise once with a minimum stroke ($H_{min}$) and once with a maximum stroke ($H_{max}$) for the switchover from a preform size to another preform size. Moreover, it is evident that the two FIGS. 5 and 6 can also differ with respect to the mutual distance between the rear side of the fastening portion 14a and the front edge of the piston-like element 12, which is here indicated as the measure M.

The precise working method of the setting unit 10, 10' is explained in greater detail below: The external wall part 8 and the internal wall part 9 form together with the top side of the middle wall part 43, and with the bottom side of the middle wall part 44, the housing of the setting unit 10. Within this housing is arranged the shaft-like element 14, comprising the fastening portion 14a, the inner threaded portion 14b and the outer threaded portion 14c. Also running through the fastening portion 14a of the shaft-like element 14, moreover, is the bolted joint 5 for the bottom side of the Z-profile 11a (not shown).

Coaxially to the shaft-like element 14 is arranged the piston-like element 12, i.e. in the region of the external thread portion 14c up to maximally the rear side of the fastening portion 14a of the shaft-like element 14. The shaft-like element 14 can here move to and fro, in a (horizontally) sliding manner, within the piston-like element 12. The movement of the piston-like element 12 along the horizontal axis $X_1$ of the setting unit 10 is achieved by turning of the nut 52, which is separated from the piston-like element 12 by the disk 53, so that upon a movement to the right, for instance, the measure M between the front edge of the piston-like element 12 and the rear side of the fastening portion 14a of the shaft-like element 14 becomes larger. Such a measure M is chosen, in particular, for small preform sizes. For larger preform sizes, as illustrated in FIG. 6, the measure M will approach zero, i.e. the fastening portion 14a will bear with its rear side directly against the front edge of the piston-like element 12.

Figure 7:
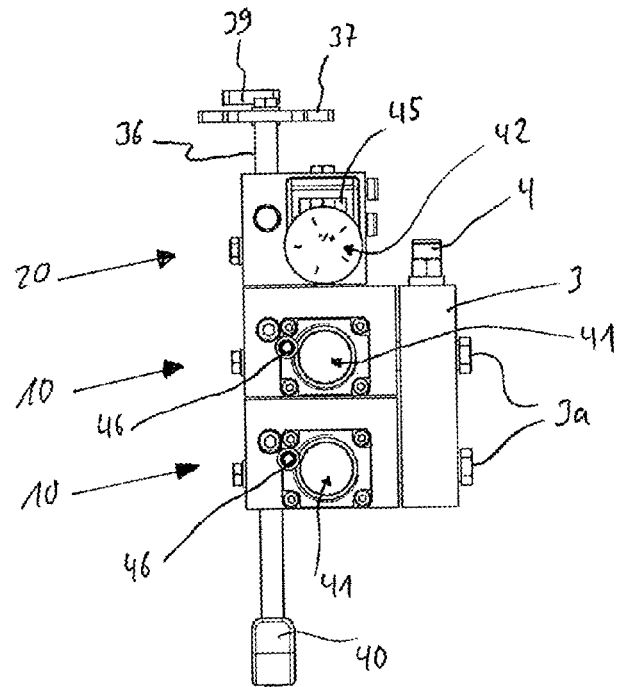
FIG. 7 shows a frontal view of the outer side of two setting units according to the invention (for width setting), and of the outer side of a height adjusting mechanism according to the invention.

As can be seen, the piston-like element 12 comprises a shank part 12a and a piston part 12b. The outwardly directed region of the shank part 12a of the piston-like element 12 is, at least partially, coaxially enclosed by a stroke setting element 17, which in turn is arranged coaxially to the shaft-like element 14 of the horizontal axis $X_1$ and to the piston-like element 12. The stroke setting element 17 forms on its outer side, together with the plastics cap 51, the rotary knob 41 shown in FIG. 7. Since the stroke-setting element 17 possesses a thread portion 17a, which cooperates with a corresponding threaded portion 8a of the external wall part 8, the stroke setting element 17 can be adjusted horizontally relative to the piston-like element 12 and to the shaft-like element 14.

Between the external wall part 8 and the internal wall part 9, as well as the top and bottom side of the middle wall part 42, 43, there is configured within the setting unit 10 an air chamber, which is divided by the piston part 12b of the piston-like element 12 into a first (left) air chamber side 13a and a second (right) air chamber side 13b. The internal wall part 9 here forms an inner or second stop 16 for the piston part 12b, and the stroke setting element 17 forms an outer or first stop 15 for the piston part 12b. The outer or first stop 15 is formed in particular by the end face of the stroke setting element 17 and, on the basis of the threaded joint 17a with the external wall part 8 or the threaded portion 8a thereof, can be adjusted in the horizontal direction. In this way, the stroke for switching from one preform size to another preform size can be variably configured.

According to FIG. 5, the stroke setting element 17 having the first stop 15 is bolted far into the first air chamber side 13a, so that the remaining stroke for the piston part 12b is minimal, which in the present case is denoted by $H_{min}$. Furthermore, the piston part 12b bears against the second stop 16 of the internal wall part 9. By contrast, according to FIG. 6, the stroke setting element 17 having the first stop 15 is almost fully unscrewed from the first air chamber side 13a, so that, for the piston part 12b, a maximum stroke ($H_{max}$) in the direction of the second stop 16 on the internal wall part 9 is obtained. Both the first air chamber side 13a and the second air chamber side 13b have an inlet for the compressed air D necessary for the execution of a piston stroke (in the present case, the inlets are denoted schematically by the vertical arrows).

In order that the piston-like element 12 can also be moved well in relation to the stroke setting element 17 and to the internal wall part 9, sliding rings 49 and 50 are respectively provided. On the inner end of the fastening portion 14a of the shaft-like element 14 can additionally be seen the inwardly directed threaded portion 14b, which, as shown, for instance, in FIG. 2, serves to receive a nut 6, with which the middle part of the Z-profile 11a can be fastened. As can likewise be seen in FIG. 2, the lower part of the Z-profile 11a is fastened to the fastening portion 14a via the bolted joint 5.

The spring 19, which is supported against the sleeve element 18 and against the fastening portion 14a, ensures moreover the necessary pretensioning between the piston-like element 12 and the shaft-like element 14. In the case of the position shown in FIG. 5, through the application of compressed air D into the second air chamber side 13b, the minimum stroke $H_{min}$ can be triggered in order to effect a (fairly small) size difference in respect of the successive preforms. In the position shown in FIG. 6, by subjecting the first air chamber side 13a to compressed air, a maximal stroke $H_{max}$ can be triggered in order to effect a switchover from a relatively large preform size to a significantly smaller preform size.

All in all, according to the invention, both the stroke H and the distance measure M can thus be altered in a simple manner by an operator from the outer side of the setting unit 10, which guarantees both high variability in terms of the respective preform sizes and a very rapid switch from one to the other (or next) preform size.

FIG. 7 illustrates once again a frontal view of two setting units 10 and of a height adjusting mechanism 20, to be precise in fitted position on the mounting bar 36. At the upper end of the mounting bar 36 is in turn found the transverse strut 37 with the fastening mechanism 39 arranged thereon. In turn, at the other end of the mounting bar 36 can be seen the head guard 40 having a rounded free end. Onto the outside of the two setting units 10, the pneumatic supply device 3 is bolted by means of the bolts 3a. In turn, on the top side of the pneumatic supply device 3 is found the compressed air port 4. The two setting units 10 comprise in particular the rotary knob 41, which on its outer face—as described in connection with FIGS. 5 and 6—is formed by the plastics cap 51. In order that the stroke setting element 17 cannot be fully unscrewed from the threaded portion 8a of the external wall part (cf. FIGS. 5 and 6), by way of precaution a safety bolt 46 with an appropriate washer is further provided, wherein the washer practically adjoins the rotary knob (and thus blocks the threaded portion 17a of the stroke setting element 17 in the outward direction). Furthermore, the height adjusting mechanism 20 additionally has a rotary knob 42, the respective position of which is indicated by means of a digital display 45.

Figure 8:
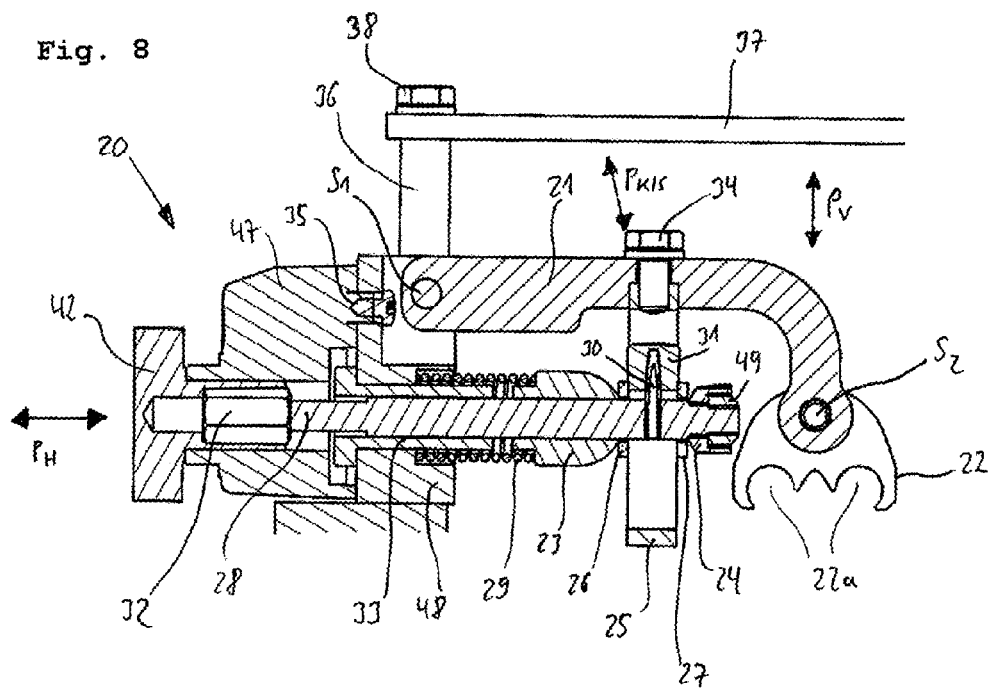
FIG. 8 shows a lateral cross-sectional view of a height adjusting mechanism according to the invention in its starting position (no deflection).

Finally, in FIG. 8, a detailed view of the height adjusting mechanism 20 according to the invention is further illustrated. In the represented embodiment, the corresponding height guide unit 22 is formed, however, not by a C-profile, but by a mounting for a linkage 22a—which is of no relevance, however, to the working method of the height adjusting mechanism 20. The height guide unit 22 is in turn linked via the pivot axis $S_2$ to the lever arm 21. For its part, the lever arm 21 is mounted pivotably via the pivot axis $S_1$ on the base part 48 of the height adjusting mechanism 20. For its part, the base part 48 is fitted via the fastening mechanism on the outer part 47 of the height adjusting mechanism 20. On the outer part 47 is arranged the rotary knob 42, which, as can be seen, is molded around a nut 32, wherein the nut 32 forms the end portion of a longitudinal adjustment device 28 (or of the longitudinal adjustment shank). The longitudinal adjustment device 28 (or of the longitudinal adjustment shank) is led by means of a guide sleeve 33 through the outer part 47, as well as through the base part 48.

On the outer side of the longitudinal setting device 28 or of the longitudinal adjustment shank is firstly arranged a first ball head element 23 (i.e. separately from the guide sleeve 33), wherein on that end of the first ball head element 23 which is situated on the ball head side is arranged a disk 26, which for its part bears against the outer side of the U-shaped bracket 25. On the other side of the U-shaped bracket 25 is in turn arranged a disk 27, which for its part serves as a support for the second ball head element 24, which latter is fixedly attached to the free end of the longitudinal adjustment device 28 (here fastened by means of a nut 52).

Within the U-shaped bracket 25 is arranged a sliding part 31, which is held by a spike 30. The U-shaped bracket 25 is fastened to the lever arm 21 by means of the bolt 34. The height adjusting mechanism 20 is fitted in its entirety on the mounting bar 36, to the upper end of which is in turn bolted the transverse strut 37. Between the base part 48 and a rear stop of the first ball head element is arranged a spring 29, which ensures a pretensioning of the first ball head element 23 in relation to the longitudinal adjustment device 28 and to the connected rotary knob 42.

If the longitudinal adjustment device 28 is now turned by means of the rotary knob 42 horizontally to the right or inward, the second ball head element 24, as well as the associated disk 27 thereof, detaches itself somewhat from the U-shaped bracket 25, as a result of which, due to the spring force which acts on the first ball head element 23, the disks 26 and 27 (slidingly) position themselves obliquely on the associated ball head surfaces, and a tilting of the U-shaped bracket, upon a simultaneous upward movement of the same, ensues. In turn, the pivot movement of the lever arm 21 about the pivot axis $S_1$ is thereby effected, which pivot movement in turn results in the vertical upward movement of the height guide unit 22. The movement of the longitudinal adjustment device 28 is here denoted by the arrow $P_H$, the vertical movement of the height guide unit 22 or of the second pivot axis $S_2$ is denoted by the arrow $P_V$, and the tilting/pivot movement of the U-shaped bracket 25 by the arrow $P_{K/S}$.

Due to the solution according to the invention, an extremely finely graduated setting for differently high mouth openings of the corresponding preforms can be obtained.

REFERENCE SYMBOL LIST 1 adjustment system
2, 2' preform
2a, 2a' body
2b, 2b' collar
3, 3' pneumatic supply device
3a, 3a' bolt
4, 4' compressed air port
5, 5' bolted joint, Z-profile
6, 6' bolted joint, Z-profile
7, 7' bolted joint, L-profile
8, 8' external wall part
8a, 8a' threaded portion (external wall part)
9, 9' internal wall part
10, 10' setting unit
11, 11' guide mechanism
11a, 11a' Z-profile
11b, 11b' L-profile (with bent plate)
12, 12' piston-like element (or piston rod)
12a, 12a' shank part
12b, 12b' piston part
13a, 13a' first air chamber side
13b, 13b' second air chamber side
14, 14' shaft-like element
14a, 14a' fastening portion
14b, 14b' threaded portion (inside)
14c, 14c' threaded portion (outside)
15, 15' first stop
16, 16' second stop
17, 17' stroke setting element
17a, 17a' threaded portion (stroke setting element)
18, 18' sleeve element
19, 19' spring (setting device)
20 height adjusting mechanism
21 lever arm
21a free end, lever arm
22 height guide unit
22a linkage (mounting)
22b C-profile
23 first ball head element
24 second ball head element
25 U-shaped bracket
26 disk
27 disk
28 longitudinal adjustment device
29 spring (longitudinal adjustment device)
30 spike
31 sliding part
32 nut
33 guide sleeve
34 bolt (U-shaped bracket)
35 fastening mechanism (base part)
36, 36' mounting bar
37 transverse strut
38 bolt
39 fastening mechanism
40 head guard
41, 41' rotary knob (setting unit)
42, 42' rotary knob (height adjusting mechanism)
43, 43' middle wall part (top side)
44, 44' middle wall part (bottom side)
45, 45' digital display
46, 46' safety bolt (with washer)
47 outer part, height adjusting mechanism
48 base part, height adjusting mechanism
49, 49' sliding ring (stroke setting element)
50, 50' sliding ring (internal wall part)
51, 51' plastics cap
52, 52' nut
53, 53' disk
$A_{min}$ minimum distance apart
$A_{max}$ maximum distance apart
D compressed air
$h_{min}$ minimum height
$h_{max}$ maximum height
$H_{min}$ minimum stroke
$H_{max}$ maximum stroke
M measure
$P_H$ horizontal movement
$P_V$ vertical movement
$P_{K/S}$ tilting/pivot movement
$S_1$ pivot axis
$S_2$ pivot axis
$X_1$ horizontal axis, setting unit

The invention claimed is:

1. An adjustment system, in particular for adjusting the distance apart of at least two guide mechanisms (11, 11') for the transport of, for instance, preforms (2) for plastics containers, wherein the at least two guide mechanisms (11, 11') are respectively connected to a setting unit (10, 10'), and wherein the setting unit (10, 10') comprises in each case at least one piston-like element (12, 12'), which is pneumatically movable to and fro between a first stop (15, 15') and a second stop (16, 16') within the setting unit (1),
wherein the setting unit (10, 10') respectively defines an air chamber (13a, 13b; 13a, 13b'), in which parts at least of the piston-like element (12, 12') are movably mounted, and
wherein at least one of the two stops (15a, 15a'; 16a, 16a') of the setting unit (10, 10') is configured adjustably.

2. The adjustment system as claimed in claim 1, wherein the piston-like element (12, 12') is configured in the form of a piston rod, which has a shank part (12a, 12a') and a piston part (12b, 12b').

3. The adjustment system as claimed in claim 1, wherein the setting unit (10, 10') has a shaft-like element (14, 14'), which is movable relative to the piston-like element (12, 12') and by means of which a measure (M) is settable in relation to the piston-like element (12, 12').

4. The adjustment system as claimed in claim 1, wherein the guide mechanism (11, 11') is respectively fitted on the shaft-like element (14, 14').

5. The adjustment system as claimed in claim 1, wherein in particular the piston part (12b, 12b') of the piston rod (12, 12') divides the air chamber into a first air chamber side (13a, 13a') and a second air chamber side (13b, 13b').

6. The adjustment system as claimed in claim 1, wherein the first (13a, 13a') and the second air chamber side (13b, 13b') are respectively connected to a pneumatic supply device (3).

7. The adjustment system as claimed in claim 1, wherein the shank part (12a, 12a') of the piston-like element (12, 12') has a hollow shank, which surrounds, at least partially, the shaft-like element (14, 14').

8. The adjustment system as claimed in claim 1, wherein the piston-like element (12, 12') and the shaft-like element (14, 14') are slidingly movable relative to each other.

9. The adjustment system as claimed in claim 1, wherein the stroke setting element (17, 17') and the piston-like element (12, 12') are slidingly movable relative to each other.

10. An adjustment system, in particular for adjusting the distance apart of at least two guide mechanisms (11, 11') for the transport of, for instance, preforms (2) for plastics containers, wherein the at least two guide mechanisms (11, 11') are respectively connected to a setting unit (10, 10'), and wherein the setting unit (10, 10') comprises in each case at least one piston-like element (12, 12'), which is pneumatically movable to and fro between a first stop (15, 15') and a second stop (16, 16') within the setting unit (1),
wherein a stroke setting element (17, 17') surrounds, at least partially, the piston-like element (12, 12') and the shaft-like element (14, 14') and is movable relative to the piston-like element (12, 12') and the shaft-like element (14, 14').

11. The adjustment system as claimed in claim 10, wherein the at least first stop (15, 15') of the setting unit (10, 10') is configured on the stroke setting element (17, 17').

12. An adjustment system, in particular for adjusting the distance apart of at least two guide mechanisms (11, 11') for the transport of, for instance, preforms (2) for plastics containers, wherein the at least two guide mechanisms (11, 11') are respectively connected to a setting unit (10, 10'), and wherein the setting unit (10, 10') comprises in each case at least one piston-like element (12, 12'), which is pneumatically movable to and fro between a first stop (15, 15') and a second stop (16, 16') within the setting unit (1),
wherein the piston-like element (12, 12') has on its end facing toward the guide mechanism a sleeve element (18, 18'), and
wherein between the sleeve element (18, 18') and a fastening portion (14a, 14a') of the shaft-like element (14, 14'), which fastening portion lies opposite the sleeve element (18, 18'), is arranged a spring (19, 19').

13. An adjustment system, in particular for adjusting the distance apart of at least two guide mechanisms (11, 11') for the transport of, for instance, preforms (2) for plastics containers, wherein the at least two guide mechanisms (11, 11') are respectively connected to a setting unit (10, 10'), and wherein the setting unit (10, 10') comprises in each case at least one piston-like element (12, 12'), which is pneumatically movable to and fro between a first stop (15, 15') and a second stop (16, 16') within the setting unit (1),
wherein the adjustment system (1) further comprises a height adjusting mechanism (20), which has at least:
a pivotably mounted lever arm (21), on a free end (21a) of which, preferably on the bottom side of which, is arranged a height guide unit (22);
a U-shaped bracket (25), which protrudes substantially perpendicularly from the lever arm (21) and which is mounted movably between two ball head elements (23, 24), and preferably disks (26, 27) each movably arranged on the ball head elements (23, 24); wherein the ball head elements (23, 24) are preferably arranged on a horizontally movable longitudinal adjustment device (28), wherein preferably at least one of the ball head elements (23, 24) is spring-loaded on the horizontally movable longitudinal adjustment device (28); and wherein,
from the starting position of the height adjusting mechanism (20), a horizontal forward movement of the longitudinal adjustment device (28), i.e. substantially in the direction of the height guide unit (22), via a tilting movement of the U-shaped bracket (25) and a pivot movement of the lever arm (21), and is converted into a substantially vertical upward movement of the free end (21a) of the lever arm (21), as well as of the height guide unit (22).

* * * * *